United States Patent
Mannis

Patent Number: 6,098,659
Date of Patent: Aug. 8, 2000

[54] COMBINED DIRECTIONAL AND FLOW CONTROL VALVE

[75] Inventor: Michael L. Mannis, Homosassa, Fla.

[73] Assignee: J. Barry Cook, Citrus Hills, Fla.

[21] Appl. No.: 09/477,177

[22] Filed: Jan. 4, 2000

[51] Int. Cl.[7] .............................. F16K 5/06; F16K 15/03
[52] U.S. Cl. ................................ 137/614.2; 137/614.17; 251/309
[58] Field of Search ............................ 137/614.2, 269.5, 137/614.17; 251/309

[56] References Cited

U.S. PATENT DOCUMENTS

| | | |
|---|---|---|
| 3,068,903 | 12/1962 | Haenky et al. ............... 137/614.2 X |
| 3,363,650 | 1/1968 | Scaramucci . |
| 3,474,818 | 10/1969 | Hartman . |
| 3,491,796 | 1/1970 | Scaramucci ................. 137/614.2 |
| 3,565,099 | 2/1971 | Huber ........................ 137/269.5 |
| 3,851,665 | 12/1974 | Coughlin . |
| 4,846,221 | 7/1989 | Kanemaru . |
| 4,928,725 | 5/1990 | Graves . |
| 5,373,868 | 12/1994 | Rodriguez . |

*Primary Examiner*—Kevin Lee
*Attorney, Agent, or Firm*—Larson & Larson, P.A.

[57] ABSTRACT

A one-way spring tensioned flapper is located at one end of a valve housing to control the direction of flow. A rotatable plug at a second end can be partially opened to control the flow rate through the valve. A top mounted handle controls movement of the rotatable plug 90° in either direction from a longitudinal line between a first and second opening to the valve. A rubber seal on each side of the flapper and the rotatable plug prevents leakage in the closed position.

12 Claims, 4 Drawing Sheets

COMBINED DIRECTIONAL AND FLOW CONTROL VALVE

BACKGROUND OF THE INVENTION

1. Field of the Invention

This invention relates to flow control valves. More particularly, it relates to a valve combining the control of flow direction at one end and the control of the flow rate at a second end.

2. Description of the Prior Art

In the prior art, U.S. Patent 3,363,650 describes a combination plug and check valve. A cylindrical plug member is located at one end of a valve and a check valve is located at the other end.

In U.S. Pat. No. 3,474,818, fluid flow is stopped in one direction in a check valve by a flapper plate and in the opposite direction, the flow fully opens the flapper plate. The valve permits flow in one direction and prevents fluid flow in the opposite direction.

In U.S. Pat. No. 3,851,665, there is a plug shut off and double check valve. A pair of tandem check valves are coaxially mounted in a plug which is lightly spring biased downwardly in a closed relationship with the valve seat.

In U.S. Pat. No. 4,846,221, a ball valve has a built-in check valve. A sealing contact portion of the check valve is brought into sealing contact with the valve seat by the biasing force of a spiral spring.

In U.S. Pat. No. 4,928,725, a combination plug and two way check valve is described. There are first and second valve seats in the body of the valve. The ball member is rotatably received in the body between the seats. A clapper is pivotally supported within the ball and is pivotable in a closed position blocking the passageway in an open position. The clapper is used as a direction flow control but is not controlled by a spring.

U.S. Pat. No. 5,373,868 describes a ball valve with a modular check valve assembly. A ball valve has a valve casing enclosing the ball and having a check valve within the ball.

Although all the above prior art references talk about valve structure having a control of flow, there is no inexpensive combination spring action flow direction and flow rate control disclosed. In the present invention a spring tension flapper valve provides an inexpensive method of controlling the direction of flow and a rotatable plug controls the rate of flow in a single polymeric housing.

SUMMARY OF THE INVENTION

A valve housing has a directional handle for movement of a rotational plug in the valve housing 90° in either direction from a longitudinal line between a first and second circular opening to the valve. At the first opening a one-way spring tensioned flapper controls the flow direction of a liquid. The handle controls the flow rate through the second circular opening by movement of the rotational plug.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Throughout the following detailed description, the same reference numbers refer to the same element in all figures.

Figure 1:
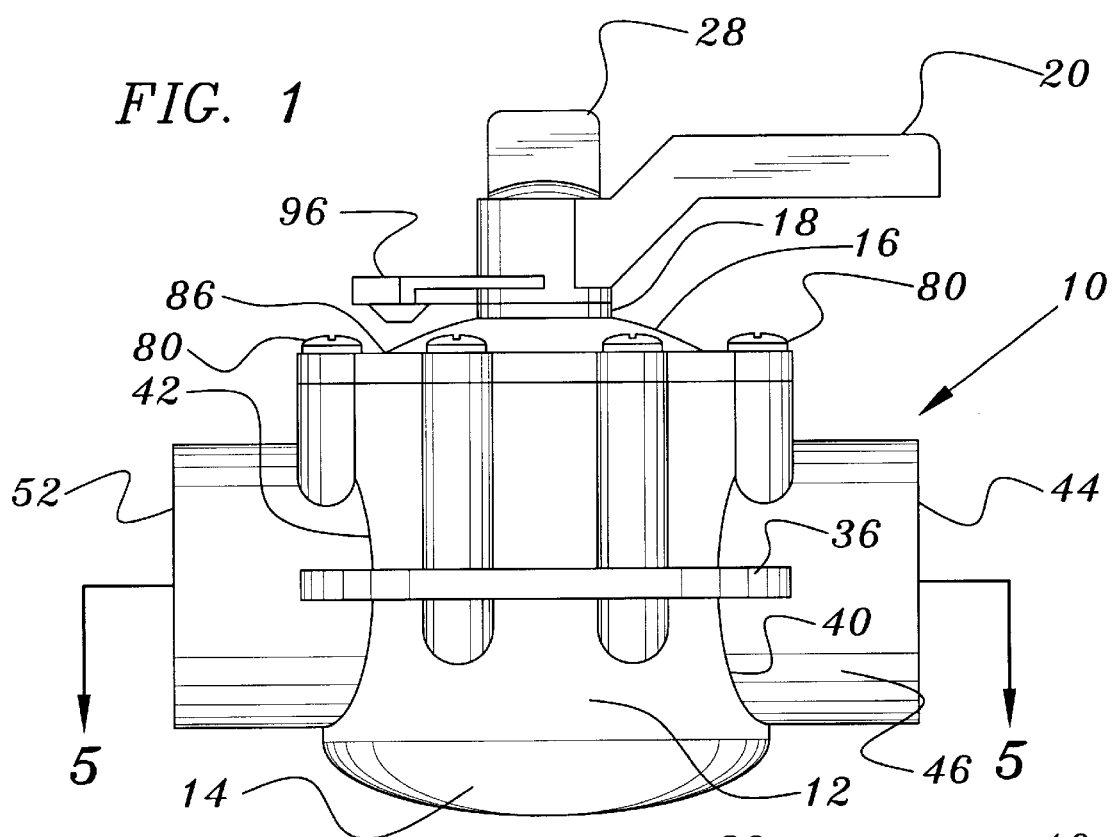
FIG. 1 is a side elevational view of the inventive valve.
Figure 2:
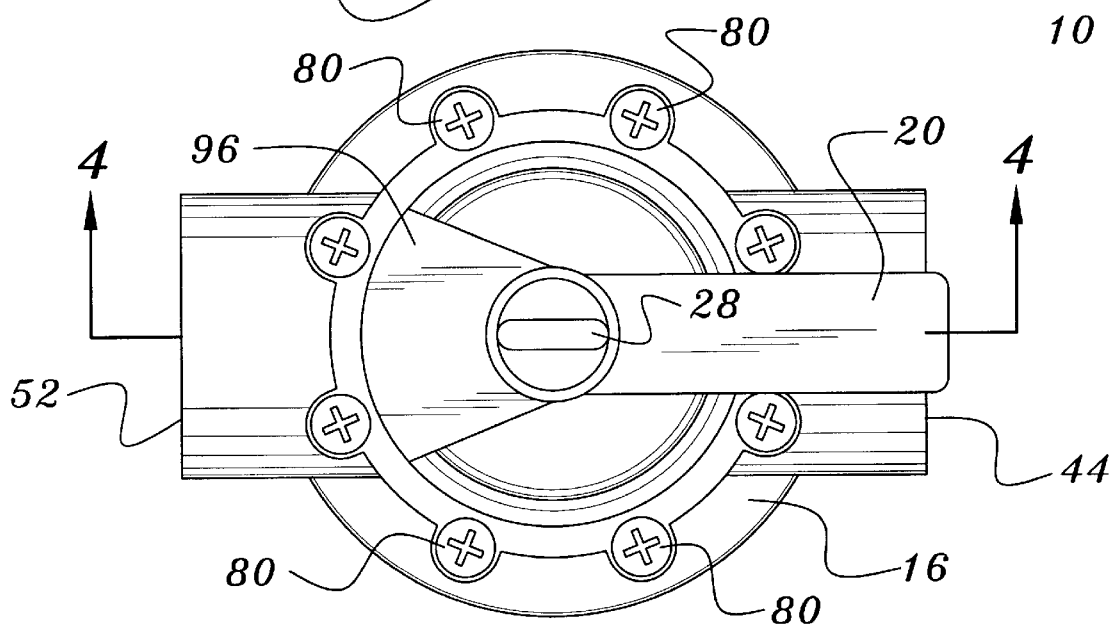
FIG. 2 is a top plan view thereof.
Figure 3:
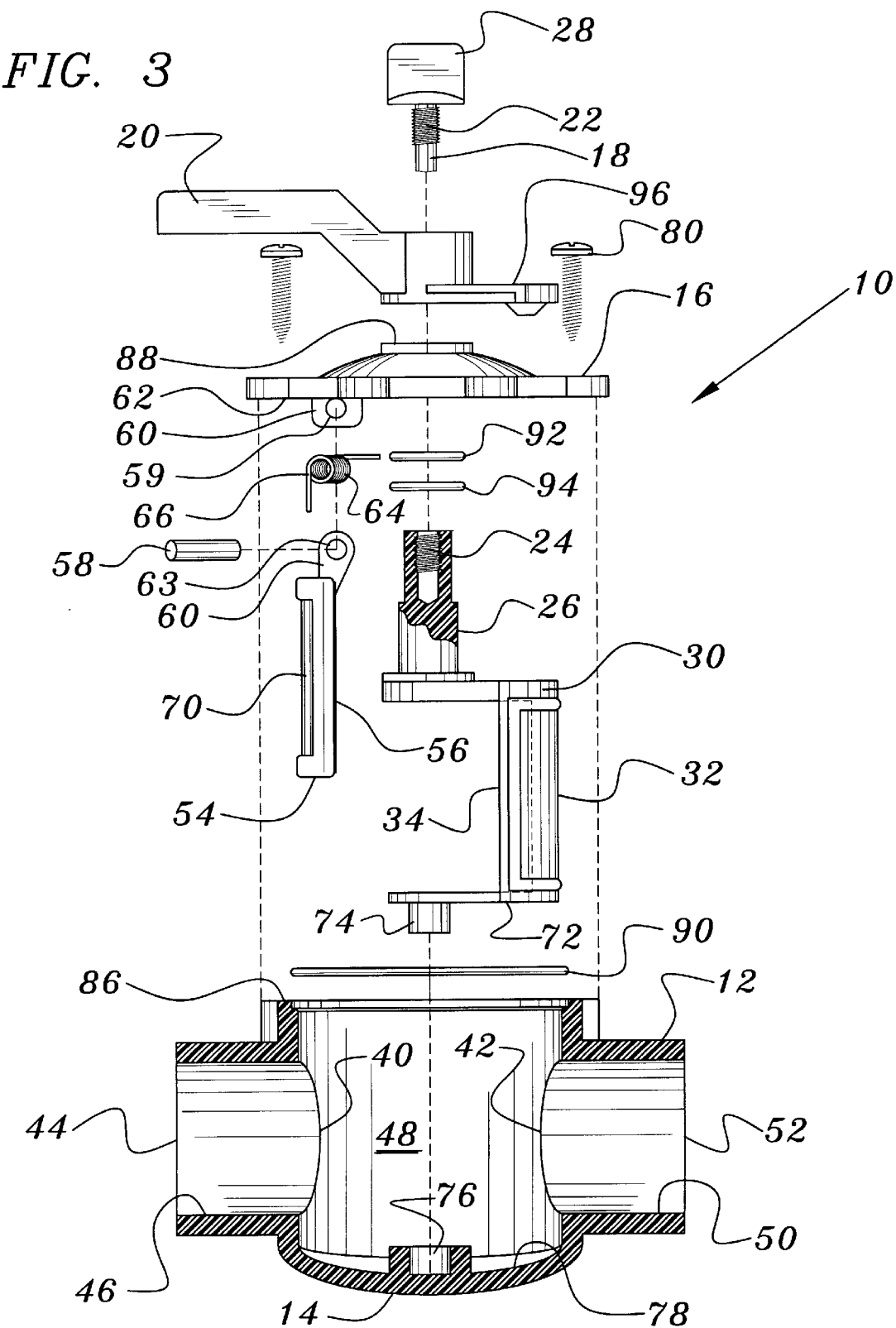
FIG. 3 is an exploded view of the component parts of the valve.
Figure 4:
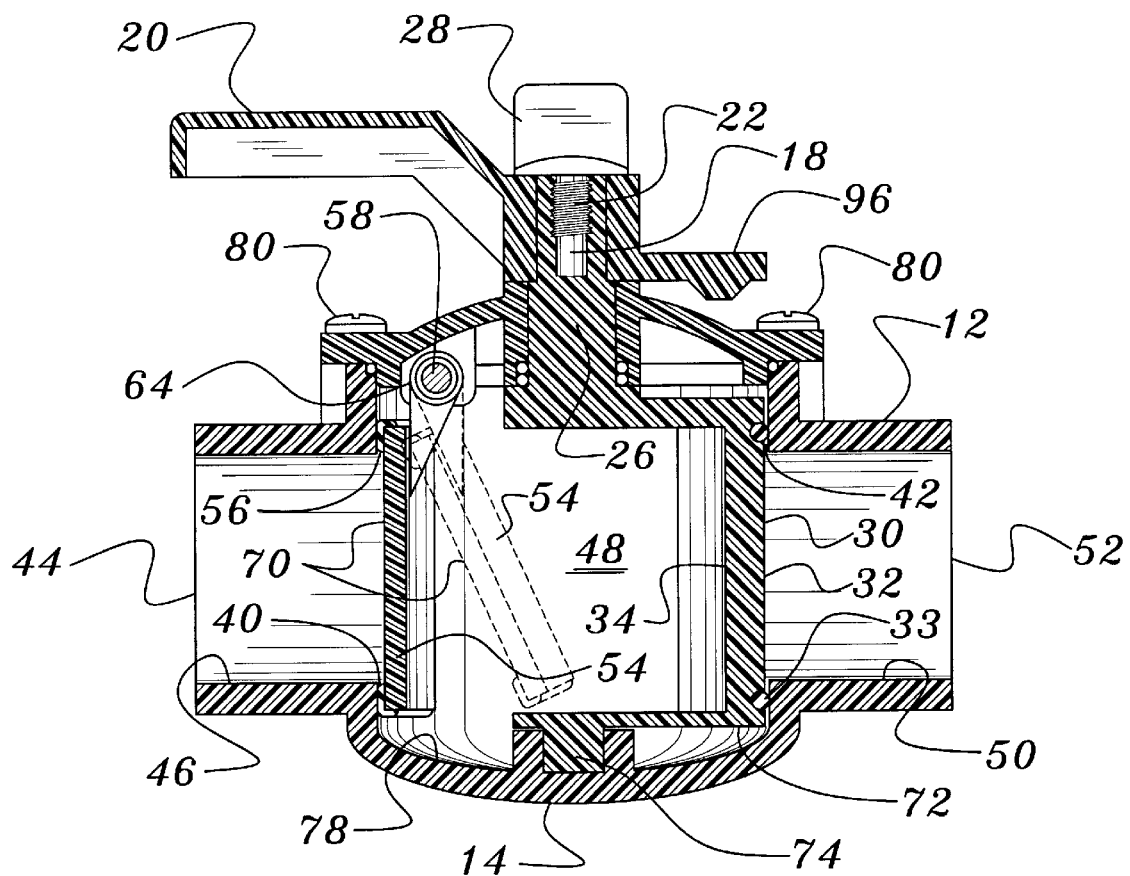
FIG. 4 is a cross-sectional view along line 4—4 in FIG. 1.

Referring to FIGS. 1 through 3, the valve 10 of this invention has a polymeric body 12 with a rounded base portion 14 and an open top 38 covered by a top circular disc 16. A shaft 18 passes through the top 17 of disc 16 and handle 20 rotates on shaft 18. The shaft 18 has threads 22 which engage threads 24 on a stem 26 integral with a rotatable plug housing 30. An annular rib 36 on the exterior of the body 12 provides support for body 12.

The plug housing 30 has a front face 32 and a back portion 34. The plug housing 30 rotates 90° on each side of a longitudinal line that bisects a front entrance opening 40 and a rear exit opening 42 to and from the valve body respectively. A first opening 44 leads to a passageway 46 passing through the center 48 of the valve body 12 and then out through openings 42 through passageway 50 to the second opening 52. An elastomeric seal 33 around the outer edge of front face 32 prevents leakage of water in the closed mode.

Pressed against opening 40 is a flapper 54 which is surrounded on its outer edge by an elastomeric sealing material 56. A bracket 61 located on a top portion of flapper 54 has a bore 63 through which is mounted pin 58. An integral bracket 60 on the underside 62 of disc 16 has a bore 59 aligned with bore 63 of bracket 61. A tension spring 64 has an opening 66 aligned with bores 59 and 63 in which pin 58 is mounted. Fluid pressure on the front face 70 of the flapper 54 causes the flapper to move inwardly and allow the fluid to flow through opening 40 from passageway 46.

A bottom 72 of the plug housing 30 has a shaft projection 74 that mounts within depression 76 on the interior surface 78 of the base 14 of the valve body 12 and permits the plug housing to be rotated up to stop 98.

Screws 80 fit through bores 82 in the disc 16 to mount the disc on the valve body 12 at a top portion 86. A finger lock knob 28 integral with the shaft 18 tightens the handle 20 in place over the disc 16 at top portion 88. O-ring 90 seals the top disc 16 to the valve body 12 and O-rings 92 and 94 seal the shaft 18 over the plug housing 30. A direction plate 96 contains indicia to direct movement of the plug housing 30.

The body 12 can be molded with any suitable high strength polymer such as polyethylene, ABS, polypropylene, copolymers or graphite. In like manner, the handle 20, flapper 54 and rotatable plug housing 30 can be molded from the same materials. The elastomeric o-ring and seals for the flapper 54 and rotatable plug face 32 are made from common elastomers well known for use as seals. The circular disc 16 can be molded from LUCITE® or other clear plastic to provide a view into the interior 48 of the valve body 12. The spring 64 is preferably a coil spring made from stainless steel.

Figure 5:
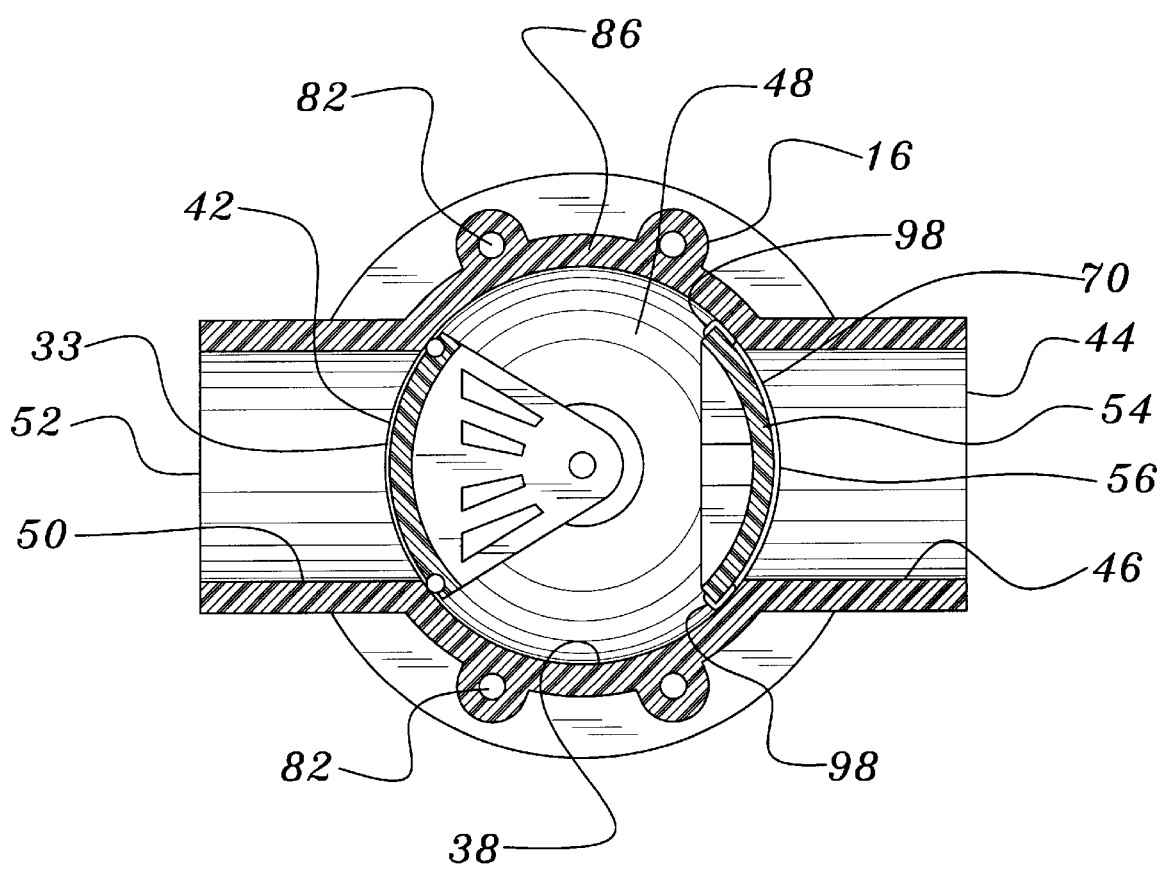
FIG. 5 is a cross-sectional view along line 5—5 in FIG. 1 showing the valve with the plug preventing flow of water.

In use, liquid flows through the front face 70 of the flapper 54 from passageway 46, through interior space 48 of the valve body and then out of opening 42 provided plug 30 is turned either to the right or left to stop 98 as shown in FIG. 5. The plug 30 can be partially turned by moving handle 20 in either direction for reduced flow.

Of course, various changes, modifications and alterations can be contemplated by those skilled in the art without departing from the intended spirit and scope thereof. As such, it is intended that the present invention only be limited by the terms of the appended claims.

Having thus described the invention what is claimed and desired to be secured by Letters Patent is:

1. A combined directional and flow control valve comprising:
   (a) a valve body having a longitudinal flow passageway formed therethrough between a first and second passageway opening in longitudinal alignment;
   (b) the first passageway opening leading through the flow passageway to a flapper tensioned by a spring, the flapper covering an entrance opening to the valve body, the flapper opening only inwardly towards an exit opening from the valve body;
   (c) the flapper having an elastomeric seal on side edges to prevent leakage around the entrance opening;
   (d) a rotatable plug housing with a front face at the exit opening, the plug housing axially connected to a means for rotating the plug housing mounted outside the valve body; and
   (e) an elastomeric seal between the front face of the rotatable plug housing and the exit opening to prevent leakage, so that a flow of liquid can flow in only one direction from the entrance opening through the exit opening when the rotatable plug housing is at least partially open.

2. The combined directional and flow control valve according to claim 1, wherein the spring is a coil spring mounted at a top portion of the flapper.

3. The combined directional and flow control valve according to claim 1, wherein the valve body is open at a top portion and has a disc shaped top affixed in a sealing mode over the top portion of the valve body.

4. The combined directional and flow control valve according to claim 3, wherein the disc shaped top has a bottom surface with a pair of brackets integral therewith protruding downwardly, each bracket having an axial bore.

5. The combined directional and flow control valve according to claim 1, wherein the flapper has a pair of upwardly protruding brackets from a top portion, each bracket having an axial bore.

6. The combined direction and flow control valve according to claim 1, wherein the rotatable plug housing rotates within a center of the valve body, having an integral top stem connected to a handle outside the valve body at a top portion and having an integral bottom shaft projection downwardly and maintained in place by a depression in a bottom surface of the valve housing.

7. The combined directional and flow control valve according to claim 4, wherein the rotatable plug housing turns up to 90° from a longitudinal center line connecting the entrance opening to the exit opening and a stop formed by each bracket to prevent turning of the plug housing more than 90° from the center line.

8. The combined directional and flow control valve according to claim 3, wherein the disc shaped top is affixed to the top portion of the valve body by multiple screws.

9. A combined directional and flow control valve comprising:
   (a) a valve body having a longitudinal flow passageway formed therethrough between a first and second passageway opening in longitudinal alignments;
   (b) a top portion of the valve body being open and the bottom closed;
   (c) the first passageway opening leading through the flow passageway to a flapper controlled by a tension spring, the flapper covering an entrance opening to a valve interior, the flapper opening inwardly towards an exit opening from the valve body;
   (d) a pair of brackets mounted on an upper portion of the flapper, each bracket having an axial bore;
   (e) a disc mounted over the open top portion of the valve body and sealed to prevent leakage of liquids outside the valve body, the disc having a pair of brackets descending from a bottom surface of the disc, each bracket having an axial bore;
   (f) a pin mounted through the tension spring, through the bores in the brackets mounted on the flapper and through the bores in the brackets descending from the disc;
   (g) a rotatable plug integral with a plug housing at the exit opening axially connected to a means for rotating the plug housing mounted outside the valve body; and
   (h) an elastomeric seal around an edge of the flapper and rotatable plug to prevent leakage so that a flow of liquid can flow in only one direction from the entrance opening through the exit opening when the rotatable plug is at least partially open.

10. The combined directional and flow control valve according to claim 9, wherein the plug housing has a shaft at a bottom portion mounted within a corresponding depression in a bottom interior surface of the valve body.

11. The combined directional and flow control valve according to claim 9, wherein the means for rotating the plug housing consists of a stem connected at a first end to a top portion of the plug housing, the stem connected at a second end to a shaft attached to a lock knob for holding a handle in a fixed position after turning and the shaft rotating in the depression when the handle is turned.

12. A combined directional and flow control valve comprising:
   (a) a valve body having a longitudinal flow passageway formed therethrough between a first and second passageway opening in longitudinal alignment, the body closed at a bottom portion and open at a top portion with a central cavity for receipt of a rotatable plug housing;
   (b) the first passageway opening leading through the flow passageway to a tensioned flapper covering an entrance opening to the valve body in sealing engagement, the flapper opening only inwardly towards an exit opening from the valve body;
   (c) a pair of brackets mounted on an upper portion of the flapper, each bracket having an axial bore, a pair of complementary brackets containing axial bores integral with a bottom surface of a disc, the disc covering the top portion of the valve body;
   (d) a pin passing through the pair of brackets on the flapper and the brackets integral with the disc and through a spring to maintain tension on the flapper; and
   (e) the rotatable plug housing connected by a stem integral with a top portion of the plug housing to an exterior handle for turning the plug housing 90° in either direction from a center line running longitudinally from the entrance opening to the exit opening, a bottom portion of the plug housing having a shaft projecting downwardly and mounting within a depression in a bottom interior surface of the valve body, the plug housing having a front face closing the exit opening from the valve body in a sealing engagement when the handle is aligned with the center line of the valve body.

* * * * *